United States Patent
Morgos et al.

(10) Patent No.: US 10,003,830 B1
(45) Date of Patent: Jun. 19, 2018

(54) CONTROLLER TO MANAGE STREAMING VIDEO OF PLAYBACK DEVICES

(75) Inventors: Marcin Morgos, Warsaw (PL); Stephen J. Kraiman, Doylestown, PA (US); Marek Bugajski, Norcross, GA (US)

(73) Assignee: ARRIS Enterprises LLC, Suwanne, GA (US)

( * ) Notice: Subject to any disclaimer, the term of this patent is extended or adjusted under 35 U.S.C. 154(b) by 0 days. days.

(21) Appl. No.: 13/476,494

(22) Filed: May 21, 2012

Related U.S. Application Data (60) Provisional application No. 61/488,525, filed on May 20, 2011.

(51) Int. Cl.
*H04N 21/231* (2011.01)
*H04H 60/46* (2008.01)
(Continued)

(52) U.S. Cl.
CPC ...... *H04N 21/23103* (2013.01); *H04H 60/46* (2013.01); *H04L 29/06027* (2013.01); *H04N 21/2187* (2013.01)

(58) Field of Classification Search
CPC ...... H04N 7/15; H04N 19/107; H04N 19/124; H04N 19/126; H04N 19/13; H04N 19/132; H04N 19/14; H04N 19/146; H04N 19/149; H04N 19/174; H04N 19/176; H04N 19/196; H04N 19/197; H04N 19/198; H04N 19/527; H04N 19/587; H04N 19/60; H04N 19/61; H04N 19/80; H04N 19/82; H04N 19/86; H04N 19/895; H04N 19/91; H04N 7/152; H04N 7/52; H04N 21/4143; H04N 21/643; H04N 7/148; H04N 21/2187; H04N 21/234; H04N 21/27; H04N 21/4349; H04N 21/43615; H04N 21/43637; H04N 21/4722; H04N 21/485; H04N 21/6125; H04N 21/6143; H04N 21/64761; H04N 21/64784; H04N 21/8173; H04N 21/818;
(Continued)

(56) References Cited

U.S. PATENT DOCUMENTS

2004/0133907 A1 * 7/2004 Rodriguez et al. ............. 725/14
2005/0226249 A1 * 10/2005 Moore ..................... 370/395.21
(Continued)

*Primary Examiner* — Chenea Smith
(74) *Attorney, Agent, or Firm* — Bart A. Perkins (57) ABSTRACT

Methods and apparatuses to manage network resources across a group of playback devices that share the same resources to control video quality across the group of playback devices are provided. A controller collects information about a plurality of playback devices wherein the playback devices share a network resource. The controller also collects information regarding the network resource. The controller allocates the network resource to deliver one or more requested video segments to one or more playback devices based on the information collected from the plurality of playback devices and the information collected regarding the network resource. By providing a controller that is aware of the available network resources and the specifications of the playback devices, the network resource can be managed in a way that improves the quality of experience for end users across all the playback devices while maximizing the efficiency of the network resources.

19 Claims, 7 Drawing Sheets

(51) Int. Cl.
*H04L 29/06* (2006.01)
*H04N 21/2187* (2011.01)

(58) Field of Classification Search
CPC .. H04N 21/812; H04N 5/262; H04N 21/2543; H04N 21/25816; H04N 21/2743; H04N 21/4532; H04N 21/4788; H04N 21/4882; H04N 21/6437; H04N 7/17309; H04N 21/231; H04N 21/234363; H04N 21/23439; H04N 21/64322; H04N 21/64746; H04N 21/2541; H04N 21/26241; H04N 21/4223; H04N 21/4627; H04N 21/63
See application file for complete search history.

(56) References Cited

U.S. PATENT DOCUMENTS

| | | | | |
|---|---|---|---|---|
| 2006/0242315 | A1* | 10/2006 | Nichols | H04N 7/17318 709/231 |
| 2007/0005792 | A1* | 1/2007 | Collet | H04L 29/06027 709/231 |
| 2011/0138064 | A1* | 6/2011 | Rieger et al. | 709/228 |
| 2011/0153856 | A1* | 6/2011 | Piepenbrink et al. | 709/231 |

* cited by examiner

CONTROLLER TO MANAGE STREAMING VIDEO OF PLAYBACK DEVICES

CROSS REFERENCE TO RELATED APPLICATION

This application claims the benefit as a non-provisional application of U.S. Provisional Application Ser. No. 61/488,525, entitled "Stateful, Segmented HTTP Transport (SHT) System for Managed Delivery of AV Content to Client Devices," which was filed on May 20, 2011, and is incorporated herein by reference in its entirety.

TECHNICAL FIELD

This disclosure relates to a controller to manage streaming video quality across the group of playback devices.

BACKGROUND

Increasingly, videos are delivered to an IP playback device over a networked environment using the Hypertext Transfer Protocol (HTTP) via a series of HTTP request and response messages ("segmented HTTP transport (SHT) method"). For example, a video can be delivered to an IP playback device using HTTP by first partitioning the video file into a series of short video segments where each video segment can be placed on a server and identified by an unique Uniform Resource Locator (URL).

Each video segment typically includes 2 to 10 seconds of the video; however, the video segment can be longer or shorter than this range. An index file that contains information regarding how to retrieve the available video segments for a video is stored on the server and identified by an URL. The index file can include the respective URLs for the video segments or information to construct such URLs.

To play the video, software ("a client") on an IP playback device first retrieves the index file from the server and then sequentially retrieves video segments from the server using the appropriate URLs. The IP playback device then sequentially plays the video segments on the integrated screen of the IP playback device or on a separately connected display.

More specifically, to play the video, the client can connect to the server and submit a HTTP request message (e.g., an HTTP GET request) to retrieve the index file for the video. The client can connect to the server by creating a (Transmission Control Protocol) TCP connection to port 80 of the server. The server then can send a HTTP response message to the client containing the index file for the desired video. Based on the information in the index file, the client can submit a series of HTTP requests to the server to retrieve the video segments needed to fill the video play out buffer. Initially, the HTTP requests may be submitted to the server at a rate faster than the actual play out. Typically, once the playback buffer in the client has reached a minimum target size, the client then sequentially submits HTTP request messages at the rate of the actual play out (for example every 2-10 seconds) to maintain at a pre-defined level the amount of available video segments in the playback buffer.

To support adaptive streaming, the server can store different versions of a video at different bit rates so that a client can download portions of the video at different bit rates as network conditions change. In some implementations, for example, the server stores the video segments at different bit rates and then the index file includes links to alternate index files for the video at the different bit rate streams. The client can switch to an alternate index file at any time during the streaming of the video as conditions warrant resulting in increased or decreased bit rate utilization on the access network.

In other implementations, for example, instead of storing multiple video segments and for each video segment storing different bit rate versions of the video segment, the server can store one file for each bit rate using, for example, the MPEG-4 Part 14 (ISO/IEC 14496-14) ("MP4") file format or MPEG-2 transport stream (ISO/IEC 13818-1) ("MPEG2TS") file format. Each MP4 or MPEG2TS file, which corresponds to the video at a particular bit rate, includes multiple video segments. The index file includes a list of the available bit rates for the video and the list of video segments for the video. To play video, the client sequentially requests video segments of the video at a particular bit rate. When the server receives the request, it extracts the MP4 or MPEG2TS video segment from the MP4 or MPEG2TS file corresponding to the requested bit rate and sends the requested MP4 or MPEG2TS video segment to the client.

End users increasingly desire to receive and watch videos on IP playback devices such as mobile devices including mobile phones, tablets, netbook, or notebook computers. However, the existing SHT methods for delivering videos are implemented independently for each playback device. That is, each playback device independently selects and requests a certain video quality (e.g., bit rate) for itself without consideration for the needs of other playback devices that share the same network resource(s). The intervening network or networks will attempt to deliver the requested video segments at the requested quality levels to the best of its ability. However, there may not be enough available resources to fulfill all the requests. In such an instance, the network may allocate less than the requested bandwidth to some playback device, while other playback devices are not fully utilizing the bandwidth allotted to them.

Accordingly, in a bandwidth-constrained environment, existing SHT methods implemented by one or more playback devices can cause video quality degradation for one or more other playback devices. For example, if one playback device wants to play new video or fast forward or rewind a video, the SHT method may attempt to quickly load or reload the playback device's playback buffer to allow the video to start or resume by requesting video segments at a higher bit rate. This type of unmanaged increase in bandwidth use from one or more playback devices can affect the ability of other playback devices to receive data thereby resulting in video quality degradation for these other playback devices. To avoid this result, existing solutions over-provision bandwidth for each subscriber premise. However, these solutions are inefficient and can be ineffective in reducing video quality degradation across playback devices.

DETAILED DESCRIPTION

Various implementations of this disclosure provide apparatuses and methods to manage network resources across a group of playback devices that share the same resources to control video quality across the group of playback devices. Thus, instead of attempting to transfer a requested video segment at a requested bit rate to a requesting playback device to the best of its ability without any consideration for what impact the transfer will have on other playback devices, implementations of this disclosure use a controller to manage network resources across the group of playback devices to control video quality across the group of playback devices.

In some implementations, the controller can reside at the headend or equivalent location. In such implementations, the controller collects information transmitted between requesting video playback devices and IP content providers. For example, the controller can monitor video bandwidth requests from the video playback devices and subsequently modify certain variables to load balance and optimize bandwidth among video playback devices. Variables available for modification include, for example, default depth of playout buffer, name or type of video player, maximum allowed depth or length of playout buffer, current depth or length of internal playout buffer, bandwidth transfer rate, video player quality, trick-play flags, round-trip delay, screen resolution, dropped frames, and buffer fill rations, among many others. In other examples, the controller can append or modify messages to the content server in lieu of or in conjunction with the requests sent from the video playback devices.

In other implementations, the controller can reside at a snooping device such as, for example, a gateway device. In such implementations, the snooper intercepts network transmissions between video playback devices and content servers. In some implementations, the snooping device can also receive information on network characteristics from the headend. The snooper can then manage video playback by appending or modifying messages between the content server and video playback devices. In alternative implementations, the controller can reside within each playback device, with necessary communication provided from an external device to manage and optimize video streaming.

In still further implementations, the content server controller can reside at the content server. In such implementations, the content server controller intercepts network transmissions between video playback devices and content servers at the content server location. In some implementations, the content server controller device can receive network characteristics from the headend. The content server controller can then manage video playback by appending or modifying messages between the content server and video playback devices. It should be understood that elements of the controller can be distributed among one or more networked devices such as, for example, an external data storage unit.

Although this disclosure makes reference to a cable-based system and components thereof, this disclosure is not intended to be limited to a cable-based system. It should be understood that the concepts disclosed herein can be applied to any access network and components thereof including any wired or wireless network or a combination of the foregoing. For example, the concepts disclosed herein can be applied to a telephone network, which can include a twisted pair (wire) communications medium, using various Digital Subscriber Line (xDSL) technologies.

Figure 1:
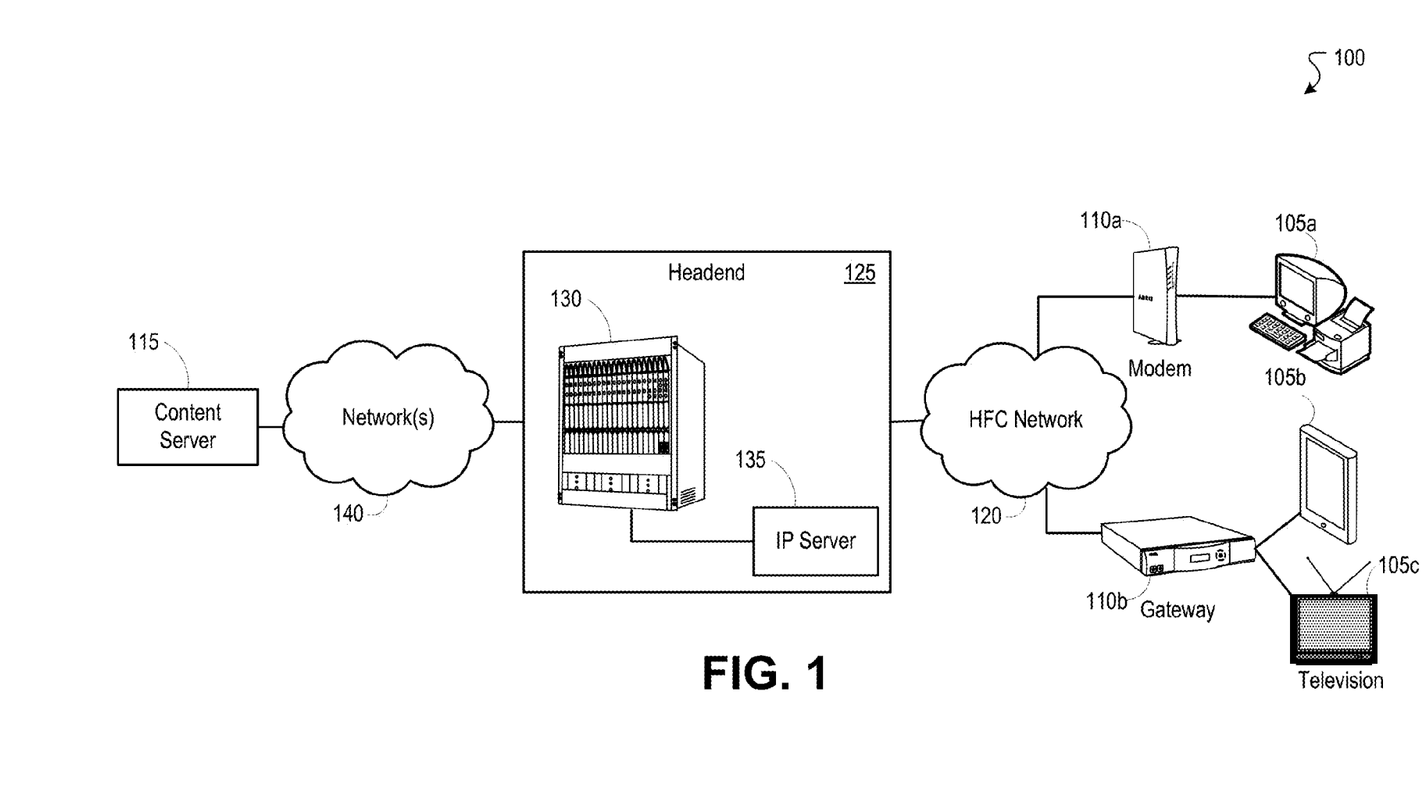
FIG. 1 is a block diagram illustrating a high-level broadband communications system for distributing videos from various video sources to various playback devices over a networked environment.

FIG. 1 is a block diagram illustrating a high-level broadband communications system for distributing videos from various video sources to various playback devices over a networked environment. One or more video playback devices 105*a-c* (such as an IP television 105*c*, mobile phone, tablet 105*b*, notebook, or computer 105*a*) can be connected to a modem 110*a* or gateway 110*b*, which is typically connected to an HFC network 120. Playback devices 105*a-c* can request a video from a content server 115 by transmitting a request through the HFC network 120 to a headend 120. In some implementations, a headend can contain a cable modem termination system (CMTS) and an IP server 135. It should be understood that the IP server 135 can represent a local content server 115 at the headend 125. In some implementations, the video stored on the content server 115 or IP server 135 typically is processed using either a MPEG-2 or a MPEG-4 codec to produce an MPEG transport stream. The MPEG transport stream then is IP-encapsulated, and the IP-encapsulated MPEG video ("IP/MPEG video") is transported (for example, using progressive or continuous streaming) over the IP network 140 to a cable headend 125 and ultimately to the IP playback device 105*a-c*.

In the headend 125, HTTP packets containing the IP/MPEG video can be received by a CMTS 135 device and converted to a QAM signal representing the video ("QAM/IP/MPEG signal"), for example, for delivery over the cable-based HFC network 120. The QAM/IP/MPEG signal can then be combined with signals for other services (e.g., voice, non-video high-speed data) to produce a combined signal. The combined signal, which includes the QAM/IP/MPEG signal, then can be transmitted over the cable-based network 120 to a subscriber premise. The cable network 120 can take the form of an all-coax, all-fiber, or hybrid fiber/coax (HFC) network, for example.

At the subscriber premise, a combined signal representing the combined signal can be received by a cable modem (CM) 110*a* or gateway (GW) device 110*b* and can be delivered (wirelessly and/or wired) to the IP playback device 105*a-c* to process and display the video. Other services (such as high speed data, for example) included in the combined signal can be delivered to other CPE devices (such as a personal computer 105*a*).

As another example, a video stored on a IP server 135 at the headend 125 can be delivered over the cable-based network 120 to, for example, another subscriber premise where it is received by an IP television 105*c*, for example, via a CM/GW 110*a-b*. Similar to video stored on the content server 115, video can be processed using either a MPEG-2 or a MPEG-4 codec to produce an MPEG transport stream. The MPEG transport stream then is IP-encapsulated, and the IP-encapsulated MPEG video ("IP/MPEG video") can be processed for delivery over the cable-based network 120 by CMTS 130 in the headend 125 to produce a QAM/IP/MPEG signal. The QAM/IP/MPEG signal can then be combined with signals from other services (e.g., QAM/IP/MPEG signal) to produce a combined signal. The combined signal, which includes the QAM/IP/MPEG signal, then can be transmitted over the cable-based network 120 to a subscriber premise.

At the subscriber premise, such as the subscriber premises having the IP playback device 105*a-c*, for example, the combined signal representing the combined signal can be received by CM/GW 110*a-b* and the IP/MPEG video representing the IP/MPEG video can be delivered to the IP playback device 105*a-c* to process and display the video.

Figure 2:
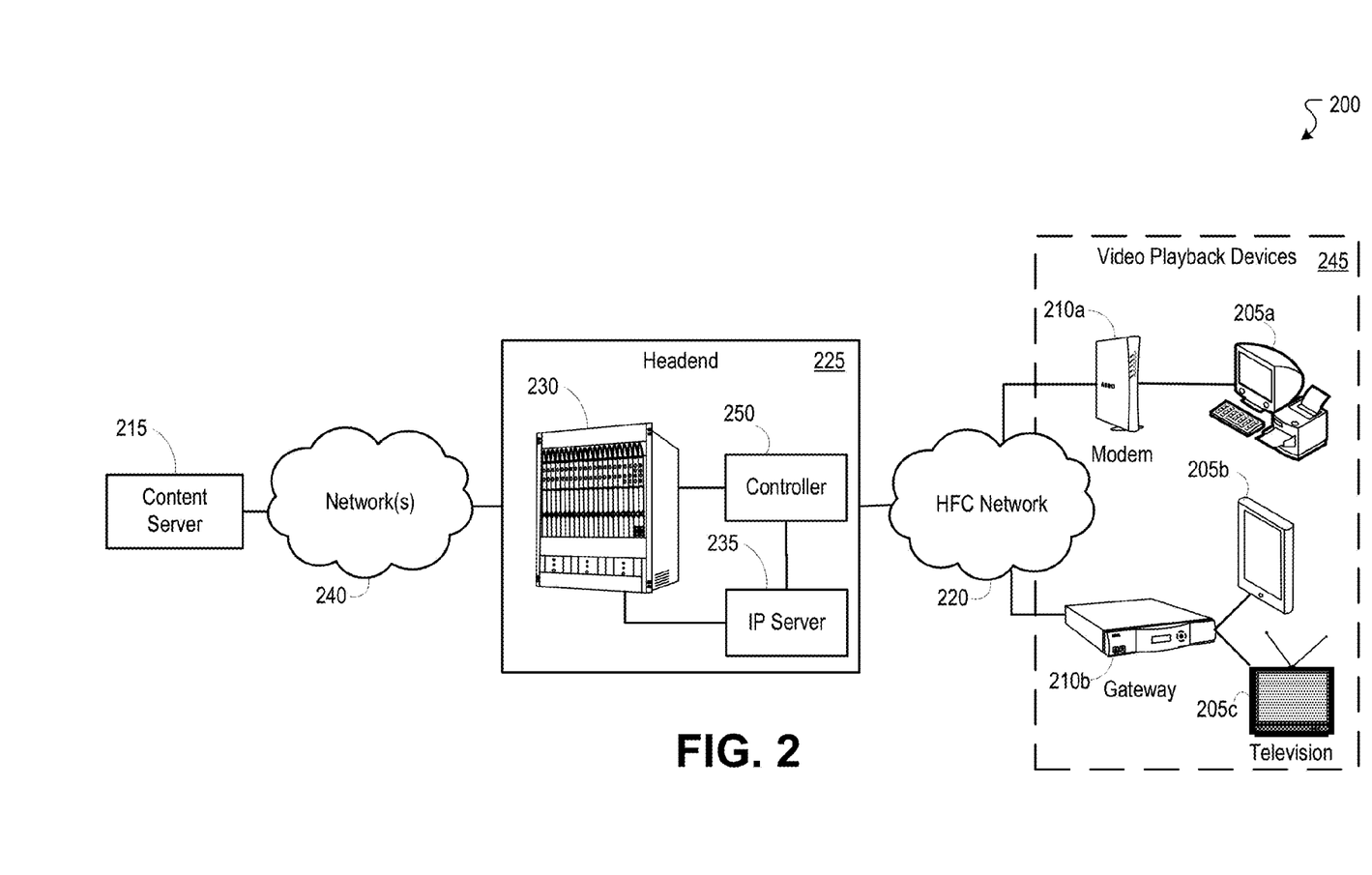
FIG. 2 is a block diagram illustrating an example system for managing network resources across a group of playback devices to control overall video quality across the group of playback devices.

FIG. 2 is a block diagram illustrating an example system for managing network resources across a group of playback devices to control overall video quality across the group of playback devices. One or more video playback devices 205*a-c* (such as an IP television 205*c*, mobile phone, tablet 205*b*, notebook, or computer 205*a*) can be connected to a modem 210*a* or gateway 210*b*, which is typically connected to an HFC network 220. Playback devices 205*a-c* can request a video from a content server 215 by transmitting a request through the HFC network 220 to a headend 225.

In some implementations, a headend can contain a cable modem termination system (CMTS) 230 and an IP server 235. It should be understood that the IP server 235 can represent a local content server 215 at the headend 225. In some implementations, the video stored on the content server 215 or IP server 235 typically has been processed using either a MPEG-2 or a MPEG-4 codec to produce an MPEG transport stream. The MPEG transport stream then was IP-encapsulated, and the IP-encapsulated MPEG video ("IP/MPEG video") can be transported (for example, progressively or streamed) over the IP network 240 to a cable headend 225 and ultimately to the IP playback device 205*a-c*.

In some implementations, managing network resources across a group of playback devices to control overall video quality across the group of playback devices 245 can be accomplished by placing a controller 250 at the headend. In other examples, the controller 250 can be located in other locations such as, for example, a gateway device 210*b*, video playback devices 205*a-c*, cable modem 210*a*, or content server 215, among many others.

In some implementations, to control video quality across a group of playback devices 245, a controller 250 can collect information about the group of playback devices 245 and collect information regarding the network resources (e.g., downstream bandwidth). The controller 250 then can use this information to allocate resources across the group of playback devices 245 to maintain a certain video quality across the group of playback devices. For example, the controller 250 can determine at what data rate and/or priority level to deliver a requested video segment to a playback device in the group of playback devices 145. The controller 250 can communicate a resource allocation decision to one or more network elements where the network element will implement the allocation decision during the processing of a video request from a playback device.

The controller 250 can receive from one of more of the playback devices any information to aid the controller 250 in making resource allocation decisions such as pertinent characteristics of the playback device, past and present state of the playback device, and the playback device's immediate needs. For example, the controller 250 can receive from each of one or more of the playback devices information regarding the playback device (e.g., name, type, version); the playout video buffer (e.g., default depth/length, maximum allowed depth/length, maximum depth/length, current depth/length); the most recently downloaded video segment (e.g., transfer rate; length (e.g., in bytes), the duration (e.g., in milliseconds) of the most recently downloaded segment); the quality levels (e.g. bit rates) available to the playback device; the quality level currently in use by the player (in bps), and the subscription level of the playback device.

The controller 250 also can receive information informing the controller 250 when the playback device seeks to switch bit rates. In some implementations, the controller 250 also can receive information informing the controller 250 of a trick play request (e.g., a pause request, a fast-forward request, a rewind request, and a slow motion requests). The controller 250 also can receive the playback device's estimation of the available inbound bandwidth; the percentage of past dropped frames; information concerning the location of the playback device on the network; the interval between transmission of the last video segment request and arrival of the response that contains the first byte of the requested segment; the maximum playback device screen resolution; the content playout time from the beginning of the session; and the segment sequence number of the currently played segment.

A playback device can transmit the above information, along with an unique identification number to identify the playback device, to the controller 250 by any means. For example, in some implementations, a playback device can include the above information with a HTTP request message to receive a video segment. One of ordinary skill in the art would know how to include such information in a request message at the playback device. For example, the information can be included as a parameter in a HTTP GET or POST command or included in a HTTP cookie. This disclosure is not limited to any particular method of including such information in a request message. This disclosure can apply to any existing or later developed method for including such information in a request message. As another example, in some implementations, a playback device can transmit the above information to the controller 250 using the Transmission Control Protocol (TCP) or the User Datagram Protocol (UDP) on top of the Internet Protocol (IP).

The controller 250 can collect information regarding the network resources (e.g., downstream bandwidth) from other network elements such as the CMTS 230. One of ordinary skill in the art would know how to determine available network resources. This disclosure is not limited to any particular method of determining network resources and can apply to any existing or later developed method for determining network resources. Based on the information received, the controller 250 can allocate network resources dynamically and/or based on pre-defined rules to achieve a desired result. For example, the controller 250 can allocate network resources to minimize the degradation of video quality to one or more playback devices. For example, during periods of congestion, the controller 250 can allocate network resources such that those playback devices that are using a relatively constant bandwidth (e.g., those playback devices that are playing out videos and not using any trick play features or in a start-up state) continue to be allocated the bandwidth involved in playing the videos without substantial video quality degradation; those playback devices that are in a non-steady state (e.g., those playback devices in a trick play mode or start-up state) are then allocated the remaining bandwidth based on, for example, predefined rules to achieve a desired result. As another example, the controller 250 can allocate network resources to normalize buffer fill ratios across playback devices to prevent a playback device from disproportionately using network resources.

The controller 250 can provide the resource allocation decisions to the CMTS 230, for example, which can then deliver the requested video segments to the requesting playback devices based on the resource allocation decisions.

In some implementations, the IP server 235 may be better able to manage resource allocation decisions such as bandwidth control. Accordingly, in some implementations, the controller 250 can provide the resource allocation decisions to the IP server 235, which can then deliver the requested video segments based on the resource allocation decisions to the requesting playback devices via the CMTS 230 as discussed above.

In some implementations, resource allocation decisions are communicated to the IP server 235 approximately every second. The controller 250 can communicate a bandwidth limit for a connection to the IP server 235, for example, using a TCP/IP connection to a management port of the IP server 140. The IP server 235 can monitor and control the bit rate on the connection by, for example, counting the number of bytes (or TCP segments/IP packets) that have been sent to output buffers associated with the TCP socket for the connection during a certain timeframe. In some implementations, the IP server 235 can update the count every millisecond. When the bandwidth limit is reached for the connection, the IP server 235 can cease sending more data on the connection for a certain amount of time.

Because a SHT session may use multiple HTTP/TCP connections for transferring video segments to an IP playback device, the controller 250 can provide a bandwidth limit to the IP server 235 for the group of connections supporting the SHT session. The IP server 235 can then apply the bandwidth limit to the group of connections.

By providing a controller 250 that is aware of the available network resources and the specifications of the playback devices, the network resources can be managed in a way that improves the quality of experience for end users across all the playback devices while maximizing the efficiency of the network resources (e.g., bandwidth usage).

Figure 3:
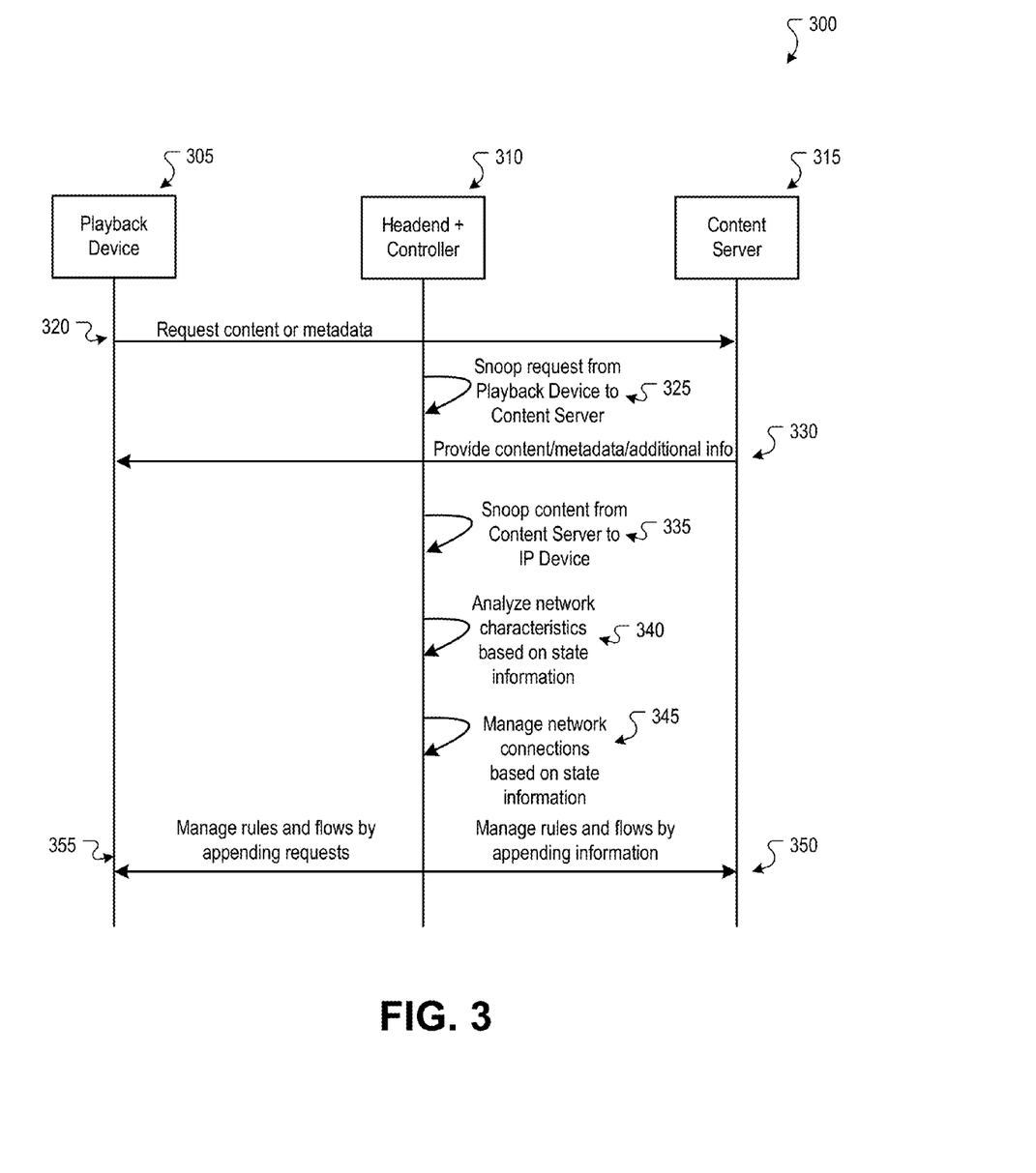
FIG. 3 is a sequence diagram illustrating an example method operable to manage network resources across a group of playback devices to control overall video quality across the group of playback devices.

FIG. 3 is a sequence diagram illustrating an example method operable to manage network resources across a group of playback devices to control overall video quality across the group of playback devices. The sequence diagram 300 can involve one or more video playback devices' 305 (e.g., video playback devices 245 of FIG. 2) interactions with a headend/controller 310 (e.g., headend 225 of FIG. 2) and a content server 315 (e.g., content server 215 of FIG. 2). The flow to manage network resources across a group of video playback devices can begin when a video playback device 305 requests content or metadata from a content server 315 at a certain data rate (320). In alternative implementations, the content server can initiate the request.

In some implementations, when the content server 315 receives the request from the video playback device, the headend/controller 310 can snoop the request for later use to manage network resources (325). In other implementations, the content server 315 can forward the request to the headend/controller 310. Once the content server 315 receives the request from the video playback device 305, the content server 315 can prepare and send the content segments at a certain data rate (330). In some implementations, the data rate is determined by communication between the video playback device 305 and the content server 315. In other implementations, the data rate is determined by network characteristics such as, for example, available bandwidth.

In some implementations, the headend/controller 310 can snoop the content segment data rate from the content server 315 to the video playback device 305 for later use to manage network resources (335). In other implementations, the headend/controller 310 can request the data rate information from the content server 315 and/or the video playback device 305.

In some implementations, when the headend/controller 310 has gathered the necessary network characteristics, the headend/controller 310 can analyze network characteristics based on state information (340). In some implementations, this analysis can look at the network load to determine maximum bandwidth and transmit times for each playback device 305.

Once the data is analyzed, the headend/controller 310 manages rules and flows for video playback device 305. In some implementations, the management rules can be applies to network resources in the headend controlling bandwidth allocations or latency characteristics of the connections to each playout device 305 (345). In some implementations, the management rules can be applied to transmissions from the content server 315 to the playback device 305 (355). In other implementations, the management rules can be applied to transmissions from the playback device 305 to the content server 315 (350). It should be understood that the management can occur at one device or among multiple devices.

Figure 4:
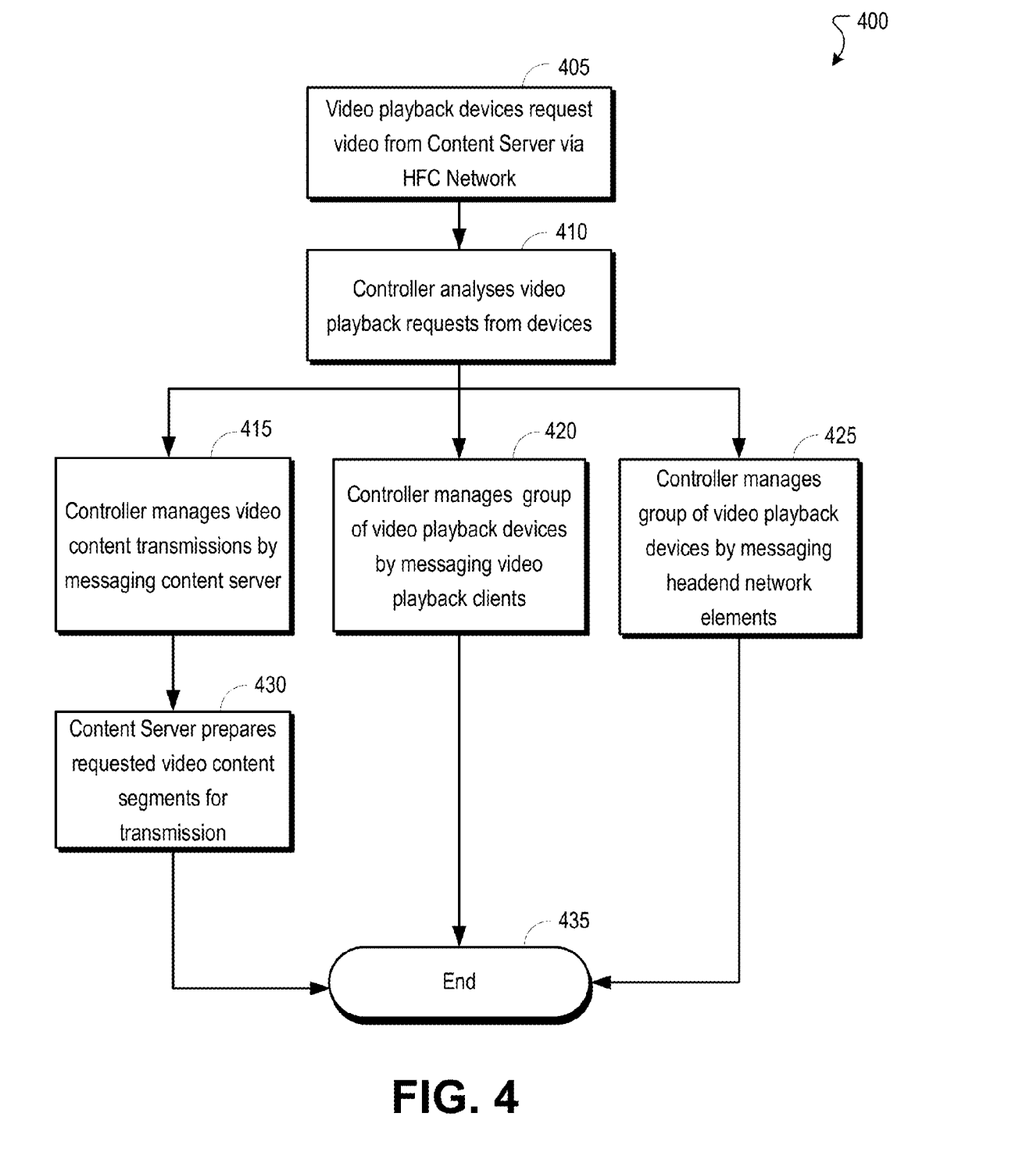
FIG. 4 is a flowchart illustrating an example process operable to manage network resources across a group of playback devices to control overall video quality across the group of playback devices using video playback devices.

FIG. 4 is a flowchart illustrating an example process operable to manage network resources across a group of playback devices to control overall video quality across the group of playback devices using video playback devices. The process 400 begins at stage 405 when the video playback devices request video from the content server via an HFC network. The request can be sent from one or more of the video playback devices (e.g., video playback devices 245 of FIG. 2 and 305 of FIG. 3) to a content server (e.g. content server 215 of FIG. 2 and 315 of FIG. 3) over an HFC network (e.g., HFC network 220 of FIG. 2). In some implementations, the content server can initiate the video streaming without a request from the playback device. In another implementation, the interaction can occur over another network such as, for example, a digital subscriber line (xDSL).

At stage 410, the controller resides and manages the network at the headend. The controller (e.g., controller 250 of FIG. 2 and 310 of FIG. 3) can gather information about transmissions between a video playback device (e.g., video playback devices 245 of FIG. 2 and 305 of FIG. 3) and a content server (e.g. content server 215 of FIG. 2 and 315 of FIG. 3) and receive network data from the headend (e.g., headend 225 of FIG. 2 and 310 of FIG. 3). In some implementations, the information about transmission requests can be gathered via a patch at each video playback device. In other implementations, the information can be gathered about the video playback device's requests by combinations of patches on other network devices.

At stage 415, the controller manages the video transmissions destined for one or more video playback devices. The controller (e.g., controller 250 of FIG. 2 and 310 of FIG. 3) can manage one or more video playback devices (e.g., video playback devices 245 of FIG. 2 and 305 of FIG. 3) by managing bandwidth at the content server (e.g. content server 215 of FIG. 2 and 315 of FIG. 3). In some implementations, management can include altering the bandwidth allocation at the content server. In other implementations, management can include the content server delaying transmission of one or more video segments to the video playback device. In another implementation, the content server can be requested to transmit lower resolution video segments. It should be understood that stage 415 can be accomplished in conjunction with stages 420 and 425.

At stage 420 the controller manages the video transmissions by messaging one or more video playback clients. The controller (e.g., controller 250 of FIG. 2 and 310 of FIG. 3) can manage one or more video playback devices (e.g., video playback devices 245 of FIG. 2 and 305 of FIG. 3) by messaging them directly to instruct the client(s) to space out their requests or transition to a lower bit rate.

At stage 425 the controller manages the video transmissions by messaging one or more headend network elements. The controller (e.g., controller 250 of FIG. 2 and 310 of FIG. 3) can manage one or more video playback devices (e.g., video playback devices 245 of FIG. 2 and 305 of FIG. 3) by managing their network bandwidth allocations. The headend network elements may restrict or increase the network bandwidth allocations for a playout client or increase or decrease latency of video transmissions of a playout client. The headend network element could also manage other characteristics of the playout client's network connection.

At stage 430, the content server prepares requested video content segments for transmission to the video playback device as directed by the controller (e.g., controller 250 of FIG. 2 and 310 of FIG. 3). The preparation of requested content can occur at the content server (e.g. content server 215 of FIG. 2 and 315 of FIG. 3) and can be destined for one or more video playback devices (e.g., video playback devices 245 of FIG. 2 and 305 of FIG. 3). In some implementations, the content server prepares and transmits the video segments. In other implementations, the content server can coordinate transmission of the video content segments from another device on the network. The process 400 ends at stage 435.

Figure 5:
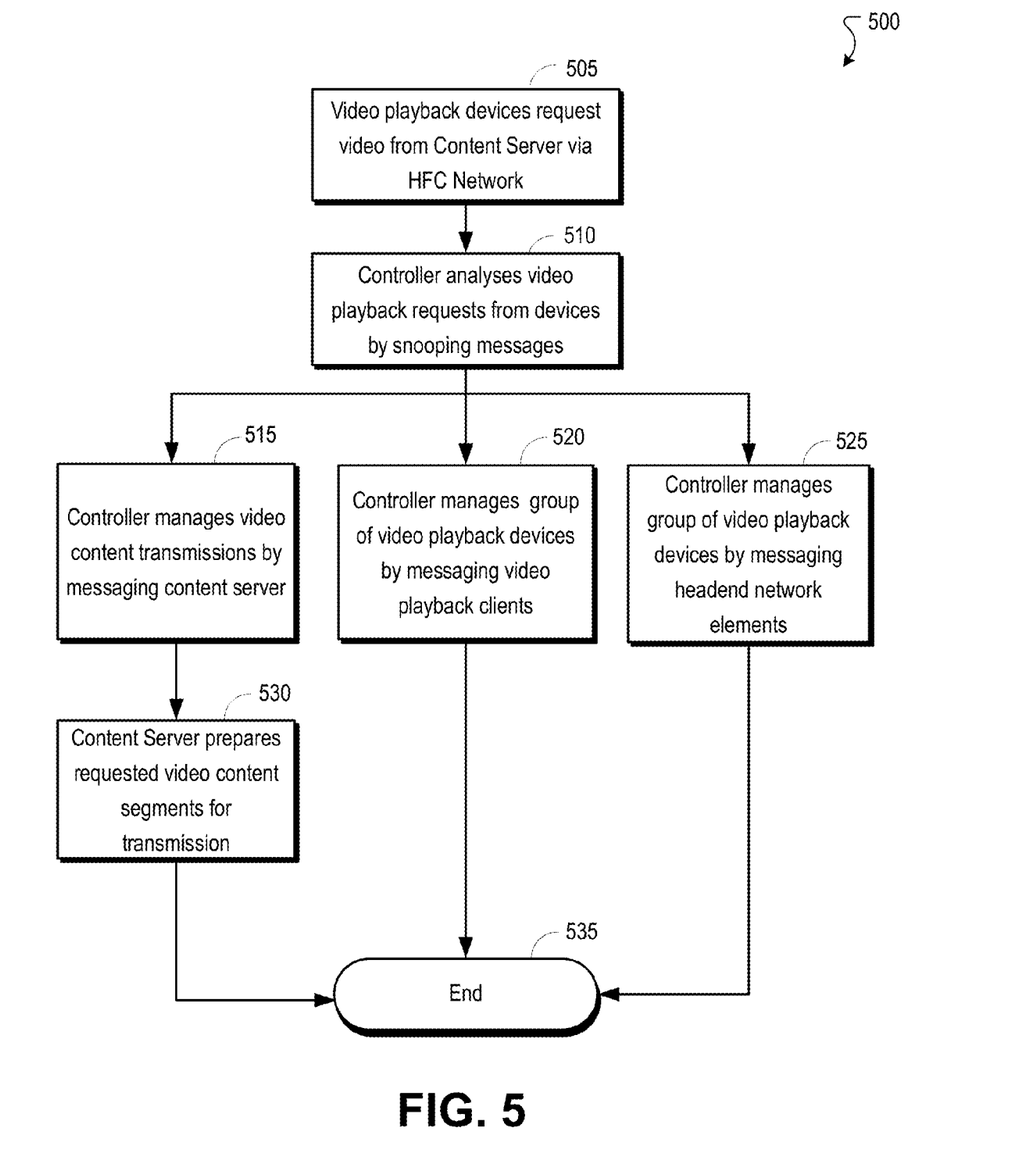
FIG. 5 is a flowchart illustrating an example process operable to manage network resources across a group of playback devices to control overall video quality across the group of playback devices using a gateway/snooper device.

FIG. 5 is a flowchart illustrating an example process operable to manage network resources across a group of playback devices to control overall video quality across the group of playback devices using a gateway/snooper device. The process 500 begins at stage 505 when the video playback devices request video from the content server via an HFC network. The request can be sent from one or more of the video playback devices (e.g., video playback devices 245 of FIG. 2 and 305 of FIG. 3) to a content server (e.g. content server 215 of FIG. 2 and 315 of FIG. 3) over an HFC network (e.g., HFC network 220 of FIG. 2). In some implementations, the content server can initiate the video streaming without a request from the playback device. In another implementation, the interaction can occur over another network such as, for example, a digital subscriber line (xDSL).

At stage 510, the controller resides and manages the network at a snooping device. The snooping device can be a network device such as, for example, a gateway (e.g., gateway 210b of FIG. 2). The controller (e.g., controller 250 of FIG. 2 and 310 of FIG. 3) can gather information about transmissions between a video playback device (e.g., video playback devices 245 of FIG. 2 and 305 of FIG. 3) and a content server (e.g. content server 215 of FIG. 2 and 315 of FIG. 3) and receive network data from the headend (e.g., headend 225 of FIG. 2 and 310 of FIG. 3). In some implementations, the information about transmission requests can be gathered via a patch at each video playback device. In other implementations, the information can be gathered about the video playback device's requests by combinations of patches on other network devices.

At stage 515, the controller manages the video transmissions destined for one or more video playback devices. The controller (e.g., controller 250 of FIG. 2 and 310 of FIG. 3) can manage one or more video playback devices (e.g., video playback devices 245 of FIG. 2 and 305 of FIG. 3) by managing bandwidth at the content server (e.g. content server 215 of FIG. 2 and 315 of FIG. 3). In some implementations, management can include altering the bandwidth allocation at the content server. In other implementations, management can include the content server delaying transmission of one or more video segments to the video playback device. In another implementation, the content server can be requested to transmit lower resolution video segments. It should be understood that stage 515 can be accomplished in conjunction with stages 520 and 525.

At stage 520, the controller manages the video transmissions by messaging one or more video playback clients. The controller (e.g., controller 250 of FIG. 2 and 310 of FIG. 3) can manage one or more video playback devices (e.g., video playback devices 245 of FIG. 2 and 305 of FIG. 3) by messaging them directly to instruct the client(s) to space out their requests or transition to a lower bit rate.

At stage 525, the controller manages the video transmissions by messaging one or more headend network elements. The controller (e.g., controller 250 of FIG. 2 and 310 of FIG. 3) can manage one or more video playback devices (e.g., video playback devices 245 of FIG. 2 and 305 of FIG. 3) by managing their network bandwidth allocations. The headend network elements may restrict or increase the network bandwidth allocations for a playout client or increase or decrease latency of video transmissions of a playout client. The headend network element could also manage other characteristics of the playout client's network connection.

At stage 530, the content server prepares requested video content segments for transmission to the video playback device as directed by the controller (e.g., controller 250 of FIG. 2 and 310 of FIG. 3). The preparation of requested content can occur at the content server (e.g. content server 215 of FIG. 2 and 315 of FIG. 3) and can be destined for one or more video playback devices (e.g., video playback devices 245 of FIG. 2 and 305 of FIG. 3). In some implementations, the content server prepares and transmits the video segments. In other implementations, the content server can coordinate transmission of the video content segments from another device on the network. The process 500 ends at stage 535.

Figure 6:
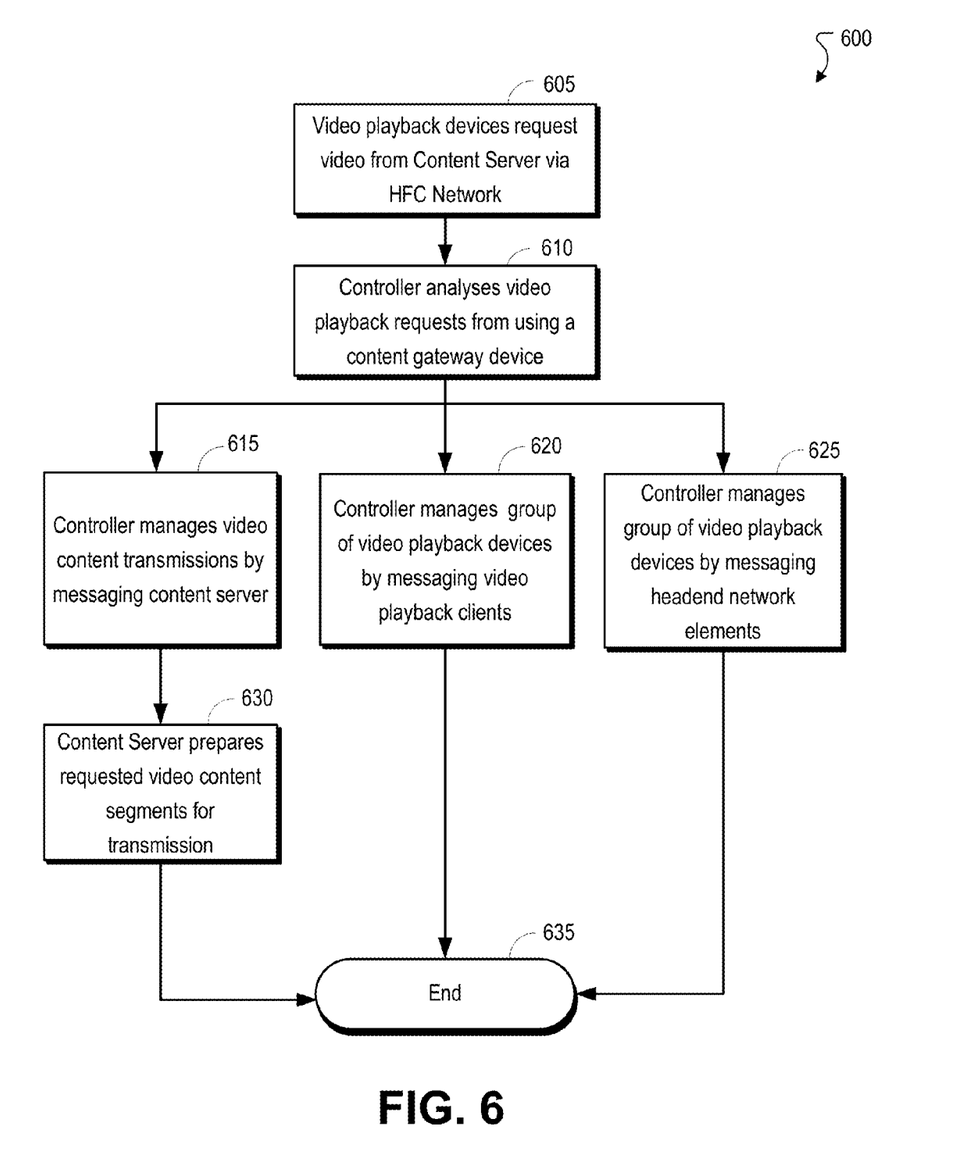
FIG. 6 is a flowchart illustrating an example process operable to manage network resources across a group of playback devices to control overall video quality across the group of playback devices using a content gateway device.

FIG. 6 is a flowchart illustrating an example process operable to manage network resources across a group of playback devices to control overall video quality across the group of playback devices using a content gateway device. The process 600 begins at stage 605 when the video playback devices request video from the content server via an HFC network. The request can be sent from one or more of the video playback devices (e.g., video playback devices 245 of FIG. 2 and 305 of FIG. 3) to a content server (e.g. content server 215 of FIG. 2 and 315 of FIG. 3) over an HFC network (e.g., HFC network 220 of FIG. 2). In some implementations, the content server can initiate the video streaming without a request from the playback device. In another implementation, the interaction can occur over another network such as, for example, a digital subscriber line (xDSL).

At stage 610, the controller resides and manages the network at a content gateway device. The content gateway device can be a networked device residing at or near the content server (e.g. content server 215 of FIG. 2 and 315 of FIG. 3). The controller (e.g., controller 250 of FIG. 2 and 310 of FIG. 3) can gather information about transmissions between a video playback device (e.g., video playback devices 245 of FIG. 2 and 305 of FIG. 3) and a content server (e.g. content server 215 of FIG. 2 and 315 of FIG. 3) and receive network data from the headend (e.g., headend 225 of FIG. 2 and 310 of FIG. 3). In some implementations, the information about transmission requests can be gathered via a patch at each video playback device. In other implementations, the information can be gathered about the video playback device's requests by combinations of patches on other network devices.

At stage 615, the controller manages the video transmissions destined for one or more video playback devices. The controller (e.g., controller 250 of FIG. 2 and 310 of FIG. 3) can manage one or more video playback devices (e.g., video playback devices 245 of FIG. 2 and 305 of FIG. 3) by managing bandwidth at the content server (e.g. content server 215 of FIG. 2 and 315 of FIG. 3). In some implementations, management can include altering the bandwidth allocation at the content server. In other implementations, management can include the content server delaying transmission of one or more video segments to the video playback device. In another implementation, the content server can be requested to transmit lower resolution video segments. It should be understood that stage 615 can be accomplished in conjunction with stages 620 and 625.

At stage 620, the controller manages the video transmissions by messaging one or more video playback clients. The controller (e.g., controller 250 of FIG. 2 and 310 of FIG. 3) can manage one or more video playback devices (e.g., video playback devices 245 of FIG. 2 and 305 of FIG. 3) by messaging them directly to instruct the client(s) to space out their requests or transition to a lower bit rate.

At stage 625, the controller manages the video transmissions by messaging one or more headend network elements. The controller (e.g., controller 250 of FIG. 2 and 310 of FIG. 3) can manage one or more video playback devices (e.g., video playback devices 245 of FIG. 2 and 305 of FIG. 3) by managing their network bandwidth allocations. The headend network elements may restrict or increase the network bandwidth allocations for a playout client or increase or decrease latency of video transmissions of a playout client. The headend network element could also manage other characteristics of the playout client's network connection.

At stage 630, the content server prepares requested video content segments for transmission to the video playback device as directed by the controller (e.g., controller 250 of FIG. 2 and 310 of FIG. 3). The preparation of requested content can occur at the content server (e.g. content server 215 of FIG. 2 and 315 of FIG. 3) and can be destined for one or more video playback devices (e.g., video playback devices 245 of FIG. 2 and 305 of FIG. 3). In some implementations, the content server prepares and transmits the video segments. In other implementations, the content server can coordinate transmission of the video content segments from another device on the network. The process 600 ends at stage 635.

Figure 7:
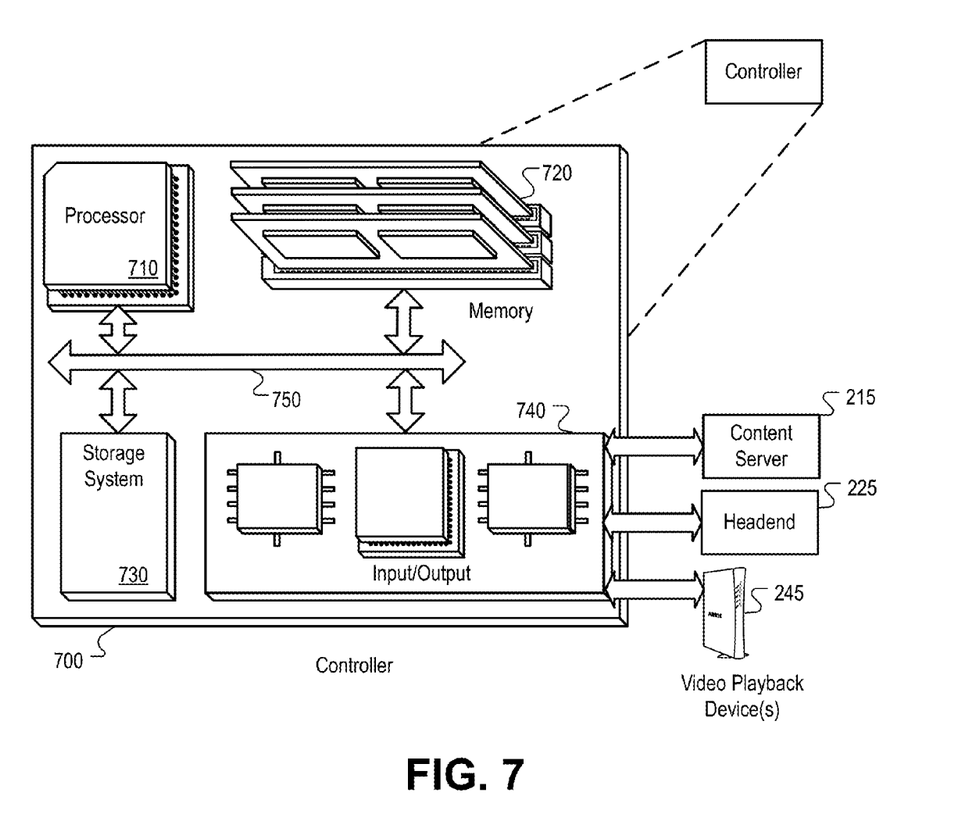
FIG. 7 is a block diagram illustrating an example broadband communications controller operable to manage network resources across a group of playback devices to control overall video quality across the group of playback devices.

FIG. 7 is a block diagram illustrating an example broadband communications controller operable to managing network resources across a group of playback devices to control overall video quality across the group of playback devices. The controller 700 with can include a processor 710, a memory 720, a storage device 730, and an input/output device 740. Each of the components 710, 720, 730, and 740 can, for example, be interconnected using a system bus 750.

The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the device 700. In one implementation, the memory 720 is a computer-readable medium. In one implementation, the memory 720 is a volatile memory unit. In another implementation, the memory 720 is a non-volatile memory unit.

In some implementations, the storage device 730 is capable of providing mass storage for the device 700. In one implementation, the storage device 730 is a computer-readable medium. In various different implementations, the storage device 730 can, for example, include a hard disk device, an optical disk device, flash memory or some other large capacity storage device.

The input/output device 740 provides input/output operations for the device 700. In one implementation, the input/output device 740 can include one or more of a content server 215 (e.g., content server 215 of FIG. 2), headend (e.g., headend 225 of FIG. 2), video playback device(s) 245 (e.g., video playback devices 245 of FIG. 2) such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content server 215, headend 225, and/or video playback devices 245), as well as sending communications to, and receiving communications from various networks.

The device (e.g., a modem device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for managing network resources across a group of playback devices, comprising:
    collecting state information about a plurality of playback devices from the plurality of playback devices wherein the plurality of playback devices share a downstream bandwidth, and wherein the state information collected for each respective one playback device of the plurality of playback devices comprises characteristics associated with the respective one playback device, information indicating the current state of a playback capability of the respective one playback device, and a current state of the respective one playback device;
    collecting current network utilization information regarding network characteristics at a central network device operable to route downstream traffic to the plurality of playback devices, wherein the central network device is operable to collect current network utilization information by snooping playback requests from the plurality of playback devices;
collecting one or more video segment request messages from one or more of the playback devices;
based upon the information indicating the current state of a playback capability of each respective one playback device and the current state of each respective one playback device:
classifying the respective one playback device as a steady-state playback device if the information indicating the current state of a playback capability of the respective one playback device provides an indication that the respective one playback device is operating in a normal playback state; and
classifying the respective one playback device as a non-steady-state playback device if the information indicating the current state of a playback capability of the respective one playback device provides an indication that the respective one playback device is operating in a trick play mode or if the state information collected for the respective one playback device provides an indication that the respective one playback device is operating in a start-up state;
allocating the available downstream bandwidth to respond to the one or more requested video segments, wherein an allocation of the available downstream bandwidth is made to each of the one or more playback devices from which a video segment request message is collected, wherein the allocation to each playback device is based on the state information collected about the plurality of playback devices and the current network utilization information collected regarding network characteristics, and wherein bandwidth is first allocated to those playback devices classified as steady-state playback devices and bandwidth remaining after allocation to the steady-state playback devices is allocated to those playback devices classified as non-steady-state playback devices; and
communicating resource limits to be used by an aggregation of the playback devices based on the allocations to a server that stores the video segments wherein the server delivers the one or more requested video segments based on network characteristics and the communicated resource limits for the aggregation of playback devices.

2. The method of claim 1, wherein network characteristics comprise an available amount of downstream bandwidth.

3. The method of claim 1, wherein communicated resource limits comprise a maximum depth of a video playout buffer.

4. The method of claim 1, wherein communicated resource limits comprise a maximum bandwidth rate.

5. The method of claim 1, wherein information collected about the plurality of playback devices comprises a buffer fill ratio.

6. The method of claim 1, wherein collecting information about the plurality of playback devices comprises collecting information via a patch at each video playback device.

7. A method for managing network resources across a group of playback devices, comprising:
collecting state information about a plurality of playback devices from the plurality of playback devices, wherein the plurality of playback devices share a downstream bandwidth, and wherein the state information collected for each respective one playback device of the plurality of playback devices comprises characteristics associated with the respective one playback device, information indicating the current state of a playback capability of the respective one playback device, and a current state of the respective one playback device;
collecting one or more video segment request messages from the playback devices by snooping playback request messages originating from the plurality of playback devices;
deriving network utilization information identifying network characteristics based on the collected video segment request message from the playback devices;
based upon the information indicating the current state of a playback capability of each respective one playback device and the current state of each respective one playback device:
classifying the respective one playback device as a steady-state playback device if the information indicating the current state of a playback capability of the respective one playback device provides an indication that the respective one playback device is operating in a normal playback state; and
classifying the respective one playback device as a non-steady-state playback device if the information indicating the current state of a playback capability of the respective one playback device provides an indication that the respective one playback device is operating in a trick play mode or if the state information collected for the respective one playback device provides an indication that the respective one playback device is operating in a start-up state;
managing the available downstream bandwidth to respond to the one or more requested video segments, wherein managing the available downstream bandwidth comprises, allocating the available downstream bandwidth, wherein an allocation of the available downstream bandwidth is made to each of the one or more playback devices from which a video segment request message is collected, wherein the allocation to each playback device is based on the state information collected about the plurality of playback devices and network utilization information collected regarding network characteristics, and wherein bandwidth is first allocated to those playback devices classified as steady-state playback devices and bandwidth remaining after allocation to the steady-state playback devices is allocated to those playback devices classified as non-steady-state playback devices; and
altering one or more playback device requests based on rules for managing the available downstream bandwidth.

8. The method of claim 7, wherein network characteristics comprise an available amount of downstream bandwidth.

9. The method of claim 7, wherein collecting state information about a plurality of playback devices comprises collecting a maximum depth of a video playout buffer.

10. The method of claim 7, wherein altering one or more playback device requests comprises reassigning maximum bandwidth rate.

11. The method of claim 7, wherein altering one or more playback device requests comprises reassigning a buffer fill ratio.

12. The method of claim 7, wherein collecting information about the plurality of playback devices comprises collecting information via a patch at each video playback device.

13. A playback controller device, comprising:
- a network interface operable to snoop playback device requests from a plurality of playback devices, the playback device requests being destined for a content server;
- a storage module operable to store state information collected from a plurality of playback devices and network utilization information derived from the snooped playback device requests regarding network characteristics, wherein the state information collected for each respective one playback device of the plurality of playback devices comprises characteristics associated with the respective one playback device, information indicating the current state of a playback capability of the respective one playback device, and a current state of the respective one playback device;
- a processor module operable to:
- based upon the information indicating the current state of a playback capability of each respective one playback device and the current state of each respective one playback device:
  - classify the respective one playback device as a steady-state playback device if the information indicating the current state of a playback capability of the respective one playback device provides an indication that the respective one playback device is operating in a normal playback state; and
  - classify the respective one playback device as a non-steady-state playback device if the information indicating the current state of a playback capability of the respective one playback device provides an indication that the respective one playback device is operating in a trick play mode or if the state information collected for the respective one playback device provides an indication that the respective one playback device is operating in a start-up state;
- allocate available downstream bandwidth to the one or more requested video segments, wherein an allocation of the available downstream bandwidth is made to each of the one or more playback devices from which a video segment request message is collected, and wherein the allocation to each playback device is based on the state information collected about a plurality of playback devices and network utilization information derived from collected snooped playback device requests used to derive network characteristics, and wherein bandwidth is first allocated to those playback devices classified as steady-state playback devices and bandwidth remaining after allocation to the steady-state playback devices is allocated to those playback devices classified as non-steady-state playback devices; and
- the processor module being further operable to alter one or more playback device requests based on rules for managing the available downstream bandwidth.

14. The playback controller device of claim 13, wherein network characteristics comprise utilization of downstream bandwidth available for video transmissions.

15. The playback controller device of claim 13, wherein altering one or more playback device request comprises reassigning maximum bandwidth rate.

16. The playback controller device of claim 13, wherein the processor is further operable to communicate limits based on the allocations to a server that stores the video segments, and the server delivers the one or more requested video segments based on network characteristics.

17. The playback controller device of claim 16, wherein communicated limits comprise a maximum depth of a video playout buffer.

18. The playback controller device of claim 16, wherein communicated limits comprise a maximum bandwidth rate.

19. The method of claim 1, wherein the allocation of the available downstream bandwidth is made to each of the one or more playback devices such that buffer fill ratios are normalized across the one or more playback devices.

* * * * *